United States Patent
Soshino (10) Patent No.: US 11,760,194 B2
(45) Date of Patent: Sep. 19, 2023

(54) FUEL ADAPTER COVER STRUCTURE OF VEHICLE

(71) Applicant: Honda Motor Co., Ltd., Tokyo (JP)

(72) Inventor: Hironori Soshino, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 17/403,884

(22) Filed: Aug. 17, 2021

(65) Prior Publication Data

US 2022/0063399 A1    Mar. 3, 2022

(30) Foreign Application Priority Data

Sep. 3, 2020  (JP) ................................ 2020-148312

(51) Int. Cl.
*B60K 15/05*    (2006.01)

(52) U.S. Cl.
CPC ........ *B60K 15/05* (2013.01); *B60K 2015/053* (2013.01)

(58) Field of Classification Search
CPC .......................... B60K 15/05; B60K 2015/053
USPC ....................................................... 280/834
See application file for complete search history.

(56) References Cited

U.S. PATENT DOCUMENTS

| 2014/0084550 A1* | 3/2014 | Ogata ...................... F16J 15/02 277/626 |
| 2022/0063399 A1* | 3/2022 | Soshino ................. B60K 15/05 |

FOREIGN PATENT DOCUMENTS

| JP | 2007290430 | | 11/2007 | |
| JP | 4422117 B2 | * | 2/2010 | |
| WO | WO-2015076898 A1 | * | 5/2015 | ......... B29C 45/1676 |

OTHER PUBLICATIONS

JP4422117B2 (Feb. 24, 2010) (Machine Translation) (Year: 2010).*

* cited by examiner

*Primary Examiner* — Mahmoud Gimie
(74) *Attorney, Agent, or Firm* — JCIPRNET (57) ABSTRACT

Provided is a fuel adapter cover structure of a vehicle which can hide a fixing portion for fixing a hinge to a body and can reduce the number of components. A fuel adapter cover structure of a vehicle includes: an oil supply port side recessed portion, a first cover portion, a second cover portion, and a hinge storage portion. The oil supply port side recessed portion has an oil supply port side flange. The hinge storage portion stores a hinge supporting a fuel lid. The first cover portion and the second cover portion are continuous to the oil supply port side flange. By the first cover portion and the second cover portion, a first rivet and a second rivet which support the hinge on a vehicle-body are covered from the outside.

8 Claims, 7 Drawing Sheets

FUEL ADAPTER COVER STRUCTURE OF VEHICLE

CROSS-REFERENCE TO RELATED APPLICATION

This application claims the priority benefits of Japanese application no. 2020-148312, filed on Sep. 3, 2020. The entirety of the above-mentioned patent application is hereby incorporated by reference herein and made a part of this specification.

BACKGROUND

Technical Field

The disclosure relates to a fuel adapter cover structure of a vehicle.

Related Art

As a fuel adapter cover structure of a vehicle, a configuration is disclosed in which an oil supply port side recessed portion and a hinge storage portion are formed in a fuel adapter cover, and the two members are partitioned by a bridge which is a separate component. An opening portion of the oil supply port side recessed portion is opened/closed by a fuel lid. The fuel lid is supported by a hinge in a way of being opened/closed freely. The hinge is attached to a vehicle-body by a fixing portion such as a rivet or the like, and is stored in the hinge storage portion. The fixing portion such as the rivet or the like is hidden in a way of being covered by the bridge which is a separate member from the outside of the vehicle (for example, see Patent literature 1).

LITERATURE OF RELATED ART

Patent Literature

[Patent literature 1] Japanese Patent Laid-Open No. 2007-290430

SUMMARY

However, in the fuel adapter cover structure of Patent literature 1, it is necessary to arrange the bridge which is a separate member in order to cover and hide the fixing portion such as the rivet or the like from the outside of the vehicle. Arranging the bridge which is a separate member hinders the reduction in the number of components of the fuel adapter cover structure.

The disclosure provides a fuel adapter cover structure of a vehicle which can hide a fixing portion for fixing a hinge to a body and can reduce the number of components.

In order to solve the problems, the disclosure proposes the following embodiments.

(1) A fuel adapter cover structure of a vehicle according to an embodiment of the disclosure includes: an oil supply port side recessed portion (for example, an oil supply port side recessed portion 25 of an embodiment), being configured in a recessed shape in a way of surrounding an oil supply port, and having a flange (for example, an oil supply port side flange 35 of an embodiment) projecting outward from an opening end in a recessed shape; a hinge storage portion (for example, a hinge storage portion 28 of an embodiment), being configured to store a hinge (for example, a hinge 22 of an embodiment) supporting a fuel lid (for example, a fuel lid 23 of an embodiment) that opens/closes the oil supply port side recessed portion; a cover portion (for example, a first cover portion 26 and a second cover portion 27 of an embodiment), being continuous to the flange of the oil supply port side recessed portion; and an embankment shaped portion (for example, an embankment shaped portion 29 of an embodiment), being positioned on a side that is closer to a bottom portion in a recessed shape (for example, an oil supply port side bottom portion 33 of an embodiment) of the oil supply port side recessed portion than the cover portion, and configured in a way of being continuous to the cover portion in a plan view. By the cover portion, a fixing portion (for example, a first rivet 88 and a second rivet 89 of an embodiment) for supporting the hinge to a body (for example, a vehicle-body 10 of an embodiment) is covered from an outside.

According to the configuration, in the hinge storage portion, the hinge which attaches the fuel lid in a way that the fuel lid is opened/closed freely is stored. The hinge is supported to the body by the fixing portion (for example, the rivet).

Here, the cover portion which is continuous to the flange of the oil supply port side recessed portion is included. That is, the cover portion is formed continuously and integrally with the flange of the oil supply port side recessed portion. The fixing portion is covered by the cover portion from the outside, and thereby the fixing portion can be hidden from an outside outer surface. In addition, the cover portion is formed continuously and integrally with the flange of the oil supply port side recessed portion. Accordingly, by covering the fixing portion for fixing the hinge to the body by the cover portion from the outside, the fixing portion can be hidden by the cover portion.

Furthermore, by forming the cover portion continuously and integrally with the flange of the oil supply port side recessed portion, the cover portion is not required to be included as a separate member, and the number of components can be reduced.

In addition, an embankment shaped portion is included on a side that is closer to the bottom portion of the oil supply port side recessed portion than the cover portion, and the embankment shaped portion is formed in a way of being continuous to the cover portion in a plan view. Thus, the oil supply port side recessed portion and the hinge storage portion can be partitioned by the embankment shaped portion. Accordingly, for example, there is no need to include a separate member to partition the oil supply port side recessed portion and the hinge storage portion.

Furthermore, for example, the embankment shaped portion is formed in an embankment shape by a top portion, a first side wall portion on the side of the oil supply port side recessed portion, and a second side wall portion on the side of the hinge storage portion. The embankment shaped portion having high rigidity is formed in a way of being continuous to the cover portion in a plan view. Thus, the rigidity of the oil supply port side recessed portion (that is, the fuel adapter cover) can be increased by the embankment shaped portion. Accordingly, the fuel adapter cover can be inserted from an opening portion of the body and easily assembled to the body.

(2) The cover portion may be disposed one step higher than the flange on an outer side of the vehicle.

According to the configuration, the cover portion is disposed one step higher than the flange on the outer side of the vehicle. Thus, the cover portion can be disposed separately so as not to interfere with the fixing portion for fixing the hinge to the body. Accordingly, the fuel adapter cover can be inserted from the opening portion of the body and easily assembled to the body.

(3) The embankment shaped portion may be continuous to a side wall (for example, an oil supply port side wall 32 of an embodiment) configured along the bottom portion of the oil supply port side recessed portion, and may have a recess portion (for example, a recess portion 75 of an embodiment) which surrounds the hinge.

According to the configuration, the embankment shaped portion is made continuous to the side wall of the oil supply port side recessed portion. Accordingly, the rigidity of the oil supply port side recessed portion can be increased by the embankment shaped portion, and the shape of the oil supply port side recessed portion can be reliably ensured.

In addition, the recess portion is formed in the embankment shaped portion, and thereby the hinge is surrounded by the recess portion. Accordingly, an escape portion for the hinge can be formed by the recess portion, and the hinge can be prevented from interfering with the embankment shaped portion.

(4) The hinge may be pivotally supported in a way of pivoting freely by a bracket (for example, a bracket 81 of an embodiment) which is fixed to a side outer panel (for example, a rear fender 12 of an embodiment) configuring an outer surface of the body.

According to the configuration, the bracket is fixed to the opening portion of the side outer panel (the body), and the hinge is pivotally supported in a way of pivoting freely by the fixed bracket. Accordingly, the hinge can be firmly and pivotally supported to the body (the side outer panel).

(5) A seal portion (for example, a second seal portion 43 of an embodiment) which is arranged at a peripheral edge (for example, a peripheral edge 28a of an embodiment) of the hinge storage portion may be included. The seal portion may be configured to seal a space between a wheel house (for example, a rear wheel house 51 of an embodiment) of the body and the peripheral edge by coming into contact with the wheel house.

According to the configuration, the seal portion is arranged at the peripheral edge of the hinge storage portion. Furthermore, the seal portion is brought into contact with the wheel house, and the space between the wheel house and the peripheral edge is sealed by the seal portion. Thus, an internal portion of the wheel house and an internal portion of the hinge storage portion (that is, the fuel adapter cover) can be partitioned by the seal portion. Accordingly, the entry of dust or the like from the internal portion of the wheel house to the internal portion of the fuel adapter cover can be cut off by the seal portion.

(6) The embankment shaped portion may have a top portion (for example, a second embankment top portion 73 of an embodiment) which faces the hinge and is inclined toward a bottom portion (for example, a bottom portion 28b of an embodiment) of the hinge storage portion as directed from the oil supply port side recessed portion to the hinge storage portion.

According to the configuration, in the embankment shaped portion, the top portion facing the hinge is inclined toward the bottom portion of the hinge storage portion as directed from the oil supply port side recessed portion to the hinge storage portion. Thus, the top portion facing the hinge can be disposed with an interval from the hinge. Accordingly, the top portion facing the hinge can be prevented from interfering with the hinge.

(7) The embankment shaped portion may have a partition wall (for example, a partition wall 67 of an embodiment) which protrudes from a part of the top portion (for example, a first embankment top portion 65 of an embodiment) on the side of the oil supply port side recessed portion.

According to the configuration, the partition wall protrudes from the part of the top portion of the embankment shaped portion on the side of the oil supply port side recessed portion. Accordingly, a partition effect between the oil supply port side recessed portion and the hinge storage portion can be increased by the partition wall.

(8) The partition wall may be configured with a draft with respect to a mold for injection-molding a fuel adapter cover (for example, a fuel adapter cover 21 of an embodiment) including the oil supply port side recessed portion, the hinge storage portion, the cover portion, and the embankment shaped portion.

According to the configuration, the draft is formed on the partition wall with respect to a mold opening direction of the mold. Accordingly, for example, when the fuel adapter cover is injection-molded, the partition wall can be prevented from becoming an undercut, and simplification of the mold can be achieved.

According to the disclosure, by covering the fixing portion for fixing the hinge to the body by the cover portion, the fixing portion can be hidden by the cover portion. Furthermore, by forming the cover portion continuously and integrally with the flange of the oil supply port side recessed portion, the cover portion is not required to be included as a separate member, and the number of components can be reduced.

DESCRIPTION OF THE EMBODIMENTS

Hereinafter, a fuel adapter cover structure of a vehicle according to one embodiment of the disclosure is described with reference to the drawings. In the drawings, an arrow FR indicates the front of the vehicle, an arrow UP indicates the upper side of the vehicle, and an arrow LH indicates the left-hand side of the vehicle. It should be noted that the usage, type and the like of the vehicle are not limited, and an automobile is described as an example in one embodiment.

<Vehicle>

Figure 1:
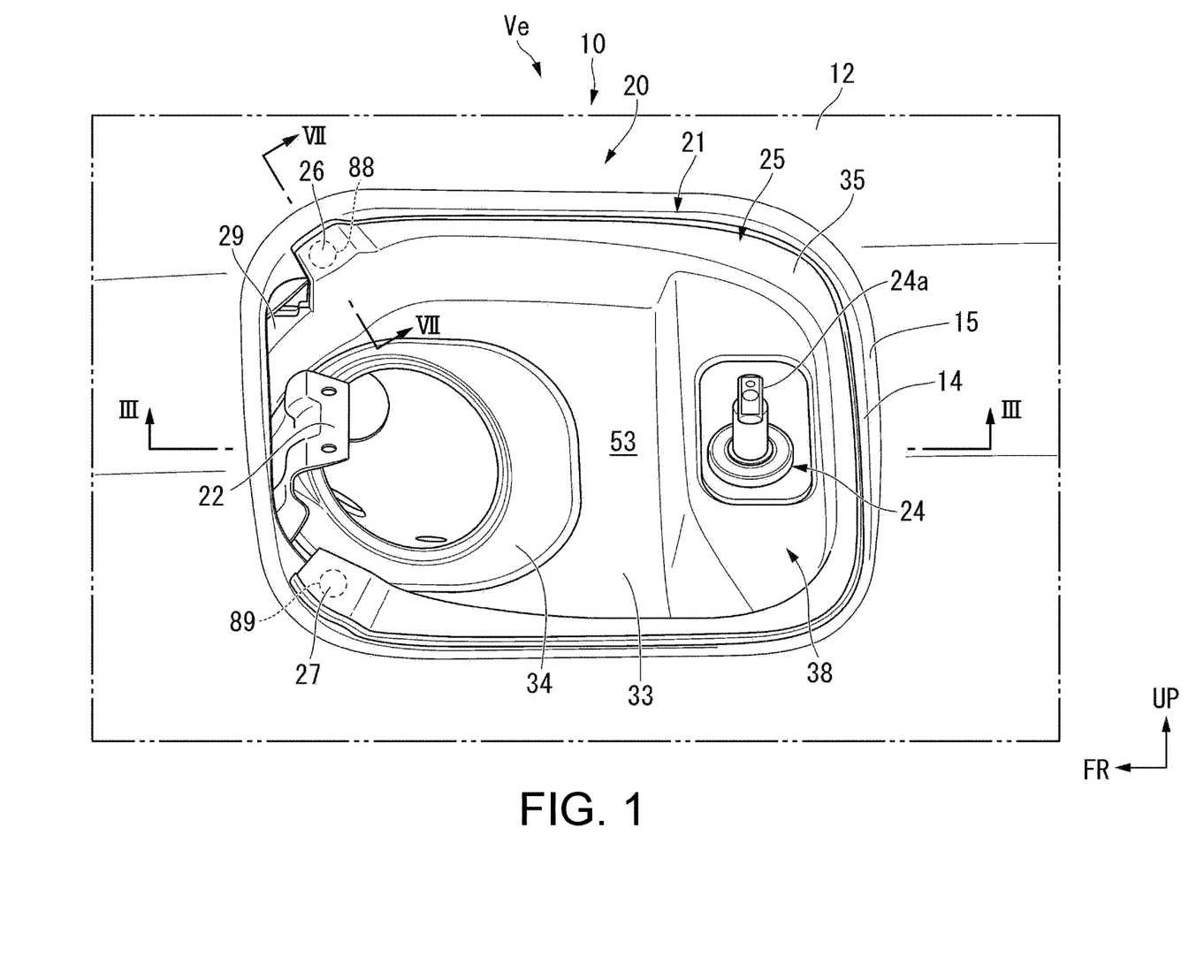
FIG. 1 is a side view showing a state in which a fuel adapter cover structure of a vehicle of one embodiment according to the disclosure is attached to a vehicle-body.
Figure 2:
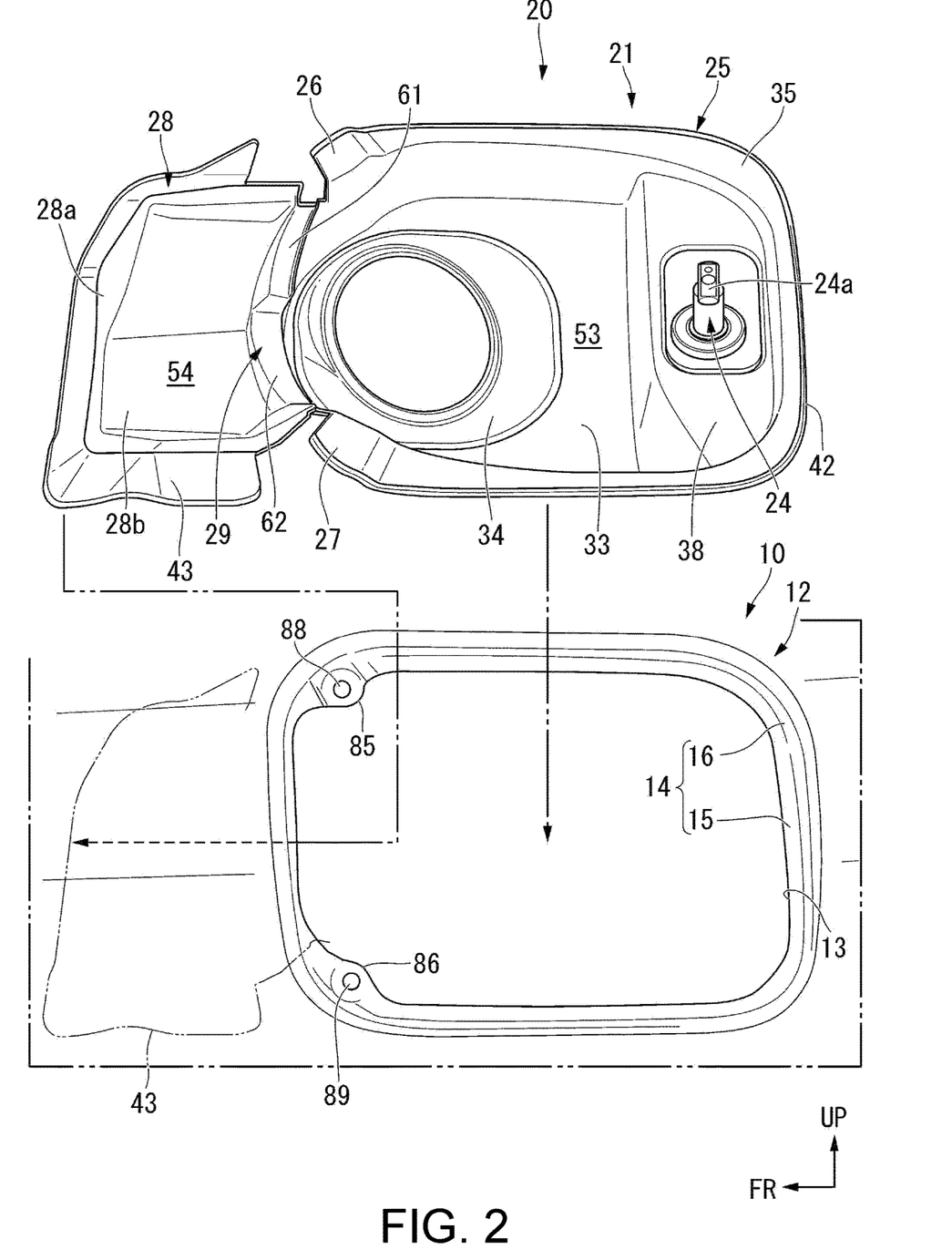
FIG. 2 is a side view showing a state in which the fuel adapter cover structure of one embodiment is removed from the vehicle-body.

As shown in FIG. 1 and FIG. 2, with regard to a vehicle Ve, for example, a fuel adapter cover structure 20 of a vehicle is attached to a rear fender 12 arranged on the left side of a vehicle-body (body) 10. For example, the rear fender 12 forms a part of the side outer panel which is positioned above a left rear wheel, the side outer panel forming a left outer side surface (an outer surface) of the vehicle-body.

With regard to the rear fender 12, a stepped portion 14 is formed by a flange 15 and a peripheral wall 16 around a fender opening portion 13. The fender opening portion 13 is formed by an inner edge of the flange 15.

Hereinafter, the fuel adapter cover structure 20 of a vehicle is abbreviated as "the fuel adapter cover structure 20".

<Fuel Adapter Cover Structure of Vehicle>

The fuel adapter cover structure 20 includes: a fuel adapter cover 21, a hinge 22, a fuel lid 23 (see FIG. 3), and a lid opener 24.

The fuel adapter cover 21 is formed in a way of surrounding an oil supply port, and is disposed in a way of covering the fender opening portion 13. The fuel adapter cover 21 includes: an oil supply port side recessed portion 25, a first cover portion (cover portion) 26, a second cover portion (cover portion) 27, a hinge storage portion 28, and an embankment shaped portion 29.

(Oil Supply Port Side Recessed Portion)

Figure 3:
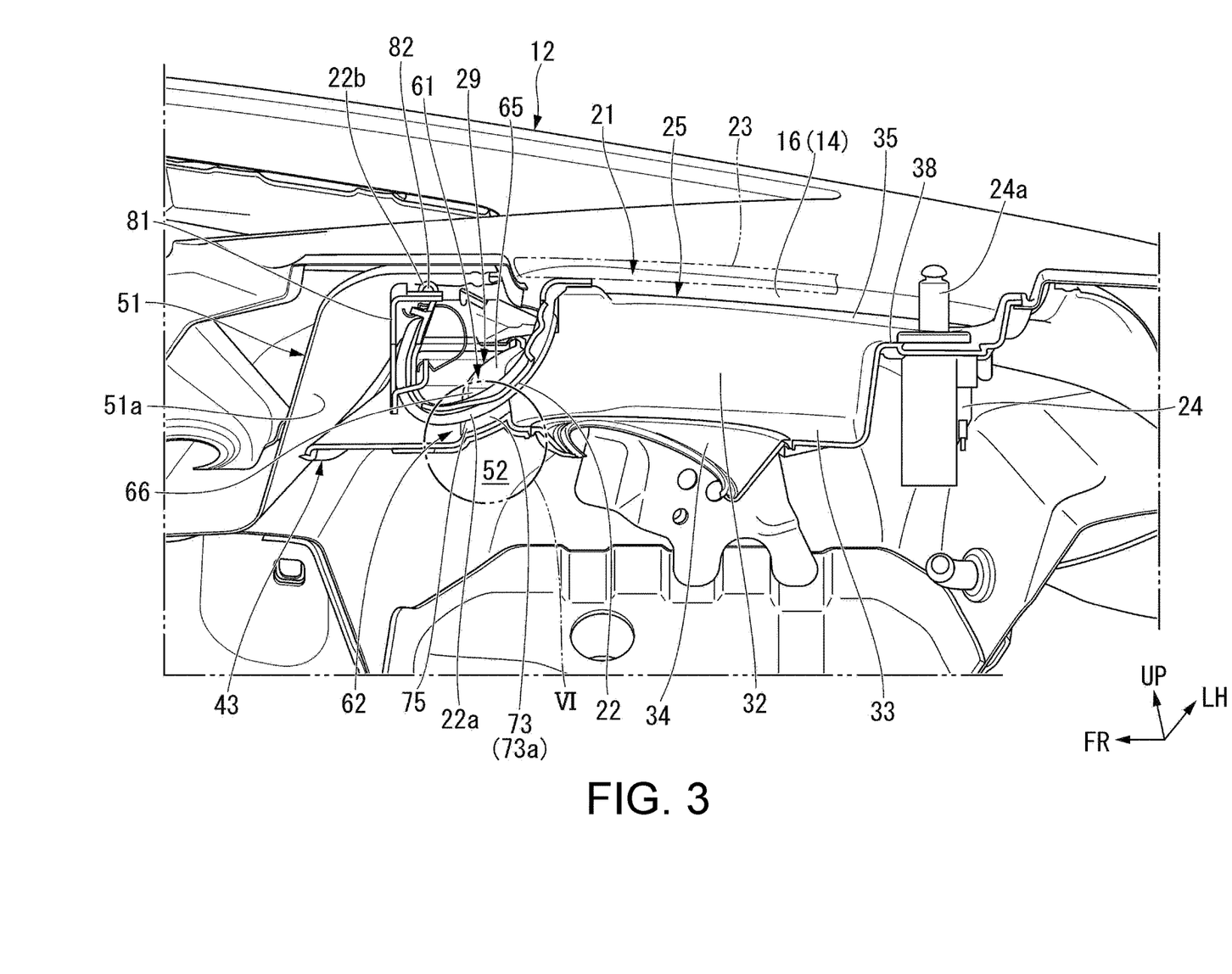
FIG. 3 is a cross-sectional view broken along a III-III line of FIG. 1.
Figure 4:
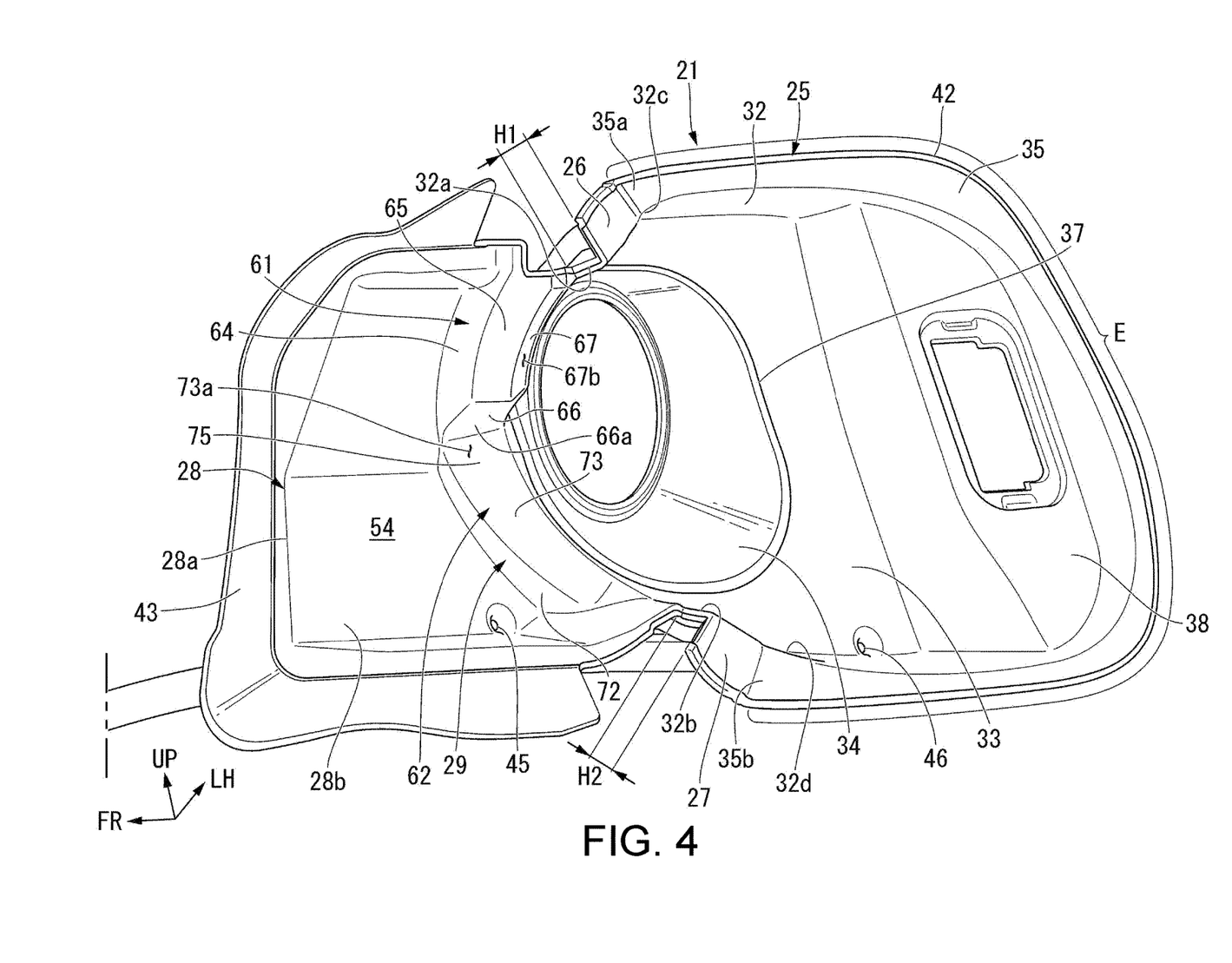
FIG. 4 is a perspective view of the fuel adapter cover structure of a vehicle of one embodiment when viewed from the left front of the vehicle-body.

As shown in FIG. 3 and FIG. 4, the oil supply port side recessed portion 25 is formed in a recessed shape in a way of surrounding the oil supply port. The oil supply port side recessed portion 25 has: an oil supply port side wall (side wall) 32, an oil supply port side bottom portion (bottom portion) 33, an oil supply port communication portion 34, and an oil supply port side flange (flange) 35.

The oil supply port side wall 32 is formed in a "C-shape" in a plan view along the oil supply port side bottom portion 33, and a first side wall end portion 32a and a second side wall end portion 32b of the oil supply port side wall 32 are disposed in an up-down direction with an interval therebetween. The embankment shaped portion 29 described later is connected to the first side wall end portion 32a and the second side wall end portion 32b.

At an end portion of the oil supply port side wall 32 on the inner side in a vehicle width direction and an end portion of the embankment shaped portion 29 on the inner side in the vehicle width direction, the oil supply port side bottom portion 33 is formed. In a part of the oil supply port side bottom portion 33 that is close to the embankment shaped portion 29 (that is, a part on the front side of the vehicle-body), an oil supply opening portion 37 is opened. The oil supply port communication portion 34 is attached to a peripheral edge of the oil supply opening portion 37. For example, the oil supply port communication portion 34 is communicated to a fuel tank through the oil supply port and an oil supply pipe (both the fuel tank and the oil supply pipe are not shown).

A stepped portion 38 is formed in a part of the oil supply port side bottom portion 33 that is opposite to the embankment shaped portion 29 (that is, a part on the back side of the vehicle-body). The stepped portion 38 is bulged out toward the side of an opening portion of the oil supply port side wall 32 (the left side in the vehicle width direction). In the stepped portion 38, the lid opener 24 is arranged.

With regard to the lid opener 24, for example, a rod 24a is biased outward in the vehicle width direction by a spring force of a spring (not shown), and a distal end protrudes outward in the vehicle width direction and comes into contact with the fuel lid 23. The fuel lid 23 is a lid that opens/closes an opening portion of the oil supply port side recessed portion 25.

When the lid opener 24 opens the fuel lid 23, the rod 24a moves outward in the vehicle width direction due to the spring force of the spring. On the other hand, when the fuel lid 23 is closed, the rod 24a moves inward in the vehicle width direction against the spring force of the spring.

At an opening end (an opening end formed in a recessed shape) of the oil supply port side wall 32 on the outer side in the vehicle width direction, the oil supply port side flange 35 is formed. Specifically, in a range E of the oil supply port side wall 32, the oil supply port side flange 35 projects from the opening end on the outer side in the vehicle width direction toward an outer side intersecting with the oil supply port side wall 32. The range E of the oil supply port side wall 32 is a region from a vicinity part 32c of the first side wall end portion 32a to a vicinity part 32d of the second side wall end portion 32b.

The oil supply port side flange 35 is brought into contact with the flange 15 of the fender opening portion 13 from the outer side in the vehicle width direction (see FIG. 2). That is, the fuel adapter cover 21 is supported by the flange 15 of the fender opening portion 13.

(First Cover Portion and Second Cover Portion)

Figure 5:
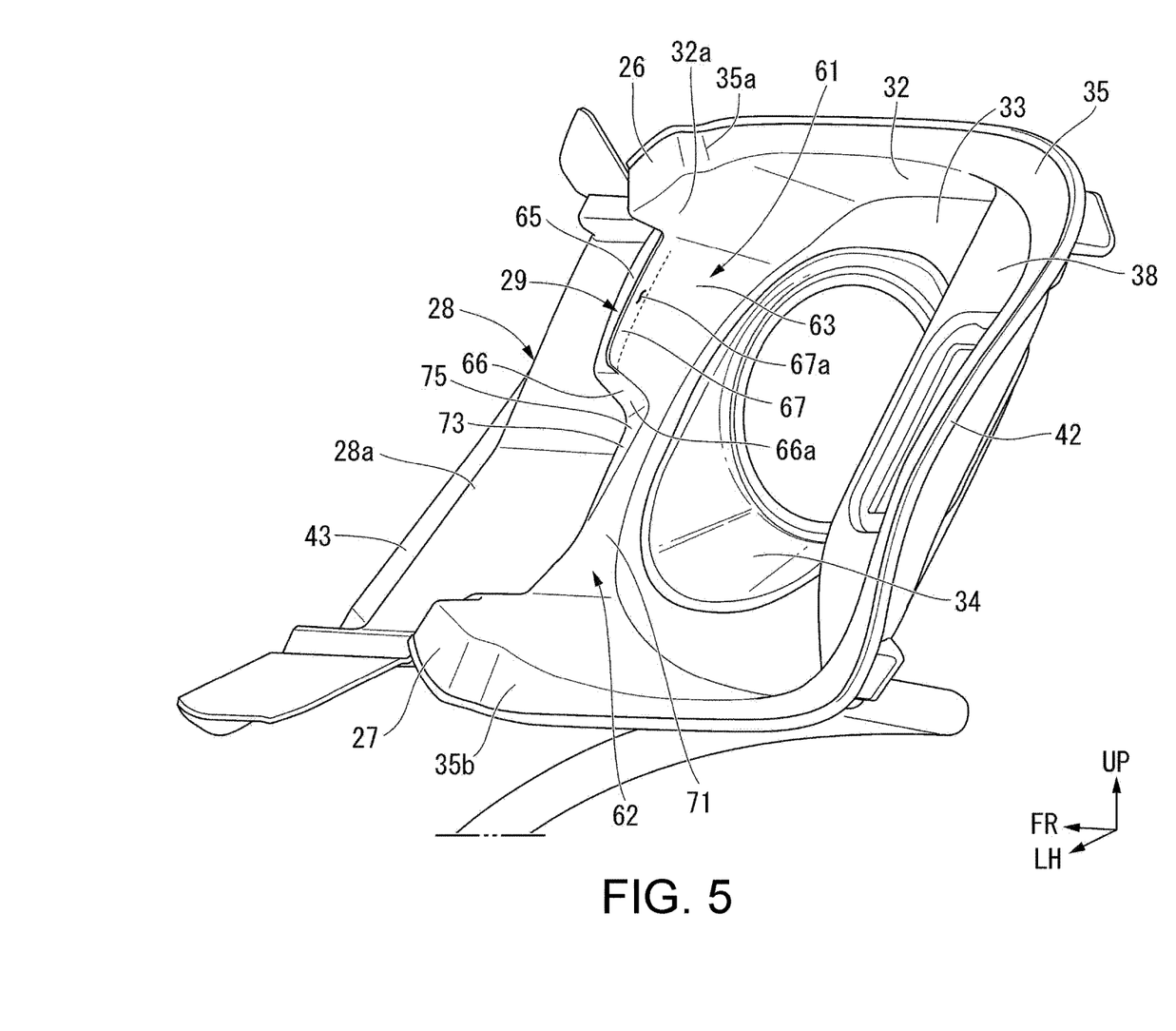
FIG. 5 is a perspective view of the fuel adapter cover structure of a vehicle of one embodiment when viewed from the left back of the vehicle-body.

As shown in FIG. 4 and FIG. 5, the first cover portion 26 is continuously formed at one end portion (that is, an upper end portion) 35a of the oil supply port side flange 35. In addition, the second cover portion 27 is continuously formed at the other end portion (that is, a lower end portion) 35b of the oil supply port side flange 35. The first cover portion 26 and the second cover portion 27 are formed continuously and integrally with the oil supply port side flange 35.

The first cover portion 26 projects from an opening end of the first side wall end portion 32a on the outer side in the vehicle width direction toward an outer side intersecting with the first side wall end portion 32a. Furthermore, the first cover portion 26 is disposed one step higher than the one end portion 35a of the oil supply port side flange 35 toward the left outer side in the vehicle width direction (the outer side of the vehicle).

The second cover portion 27 projects from an opening end of the second side wall end portion 32b on the outer side in the vehicle width direction toward an outer side intersecting with the second side wall end portion 32b. Furthermore, the second cover portion 27 is disposed one step higher than the other end portion 35b of the oil supply port side flange 35 toward the left outer side in the vehicle width direction (the outer side of the vehicle). That is, the first cover portion 26 and the second cover portion 27 are disposed one step higher than the oil supply port side flange 35 toward the outer side in the vehicle width direction.

In addition, the first cover portion 26 is disposed in a position where the first cover portion 26 covers a first rivet 88 described later from the left outer side in the vehicle width direction (the outer side). The second cover portion 27 is disposed in a position where the second cover portion 27 covers a second rivet 89 described later from the left outer side in the vehicle width direction (the outer side).

A first seal portion 42 is arranged at the peripheral edge of each of the oil supply port side flange 35, the first cover portion 26, and the second cover portion 27. The first seal portion 42 is formed by a material having elasticity such as rubber, resin, or the like.

(Hinge Storage Portion)

In the vicinity of the oil supply port side recessed portion 25, the hinge storage portion 28 is formed via the embankment shaped portion 29 described later. The hinge storage portion 28 is formed in a recessed shape toward the inner side in the vehicle width direction so as to store the hinge 22.

In addition, a second seal portion (seal portion) 43 is arranged at a peripheral edge 28a of the hinge storage portion 28. The second seal portion 43 is formed by a material having elasticity such as rubber, resin, or the like.

As shown in FIG. 1 and FIG. 2, in the fuel adapter cover 21, the embankment shaped portion 29 is formed between the oil supply port side recessed portion 25 and the hinge storage portion 28. The fuel adapter cover 21 is attached to the vehicle-body 10 by using, for example, attachment holes 45 and 46 (see FIG. 2) or the like, and the oil supply port side recessed portion 25 of the fuel adapter cover 21 is disposed in the fender opening portion 13.

In this state, a state is maintained in which the oil supply port side flange 35 comes into contact with the flange 15 of the rear fender 12, and the first seal portion 42 comes into contact with the flange 15. Thus, an internal portion 52 of a rear wheel house (wheel house) 51 (both see FIG. 3) and an internal portion 53 of the oil supply port side recessed portion 25 can be partitioned by the first seal portion 42.

As shown in FIG. 3 and FIG. 4, the second seal portion 43 comes into contact with the rear wheel house 51 (specifically, a wall surface portion 51a of the rear wheel house 51) of the vehicle-body 10. The second seal portion 43 comes into contact with the wall surface portion 51a of the rear wheel house 51, and thereby a space between the wall surface portion 51a and the peripheral edge 28a of the hinge storage portion 28 can be sealed. Thus, the internal portion 52 of the rear wheel house 51 and an internal portion 54 of the hinge storage portion 28 can be partitioned by the second seal portion 43.

Accordingly, the entry of dust or the like from the internal portion 52 of the rear wheel house 51 to the internal portion of the fuel adapter cover 21 (specifically, the internal portion 53 of the oil supply port side recessed portion 25 and the internal portion 54 of the hinge storage portion 28) can be cut off by the first seal portion 42 and the second seal portion 43.

(Embankment Shaped Portion)

As shown in FIG. 4 and FIG. 5, the embankment shaped portion 29 is positioned on the side of the oil supply port side bottom portion 33 lower than the first cover portion 26 and the second cover portion 27 (that is, the inner side in the vehicle width direction). The embankment shaped portion 29 is connected to the first side wall end portion 32a and the second side wall end portion 32b of the oil supply port side wall 32, and is formed in a curved shape along the oil supply port side wall 32 in a way of being continuous to the first cover portion 26 and the second cover portion 27 in a plan view.

Thus, the oil supply port side recessed portion 25 and the hinge storage portion 28 (described later) can be partitioned by the embankment shaped portion 29. Accordingly, for example, there is no need to include a bridge or the like as a separate member to partition the oil supply port side recessed portion 25 and the hinge storage portion 28 as before.

Here, the embankment shaped portion 29 and the hinge storage portion 28 are formed lower than the first cover portion 26 by H1 on the inner side in the vehicle width direction, and are formed lower than the second cover portion 27 by H2 on the inner side in the vehicle width direction. Specifically, the embankment shaped portion 29 and the hinge storage portion 28 are formed lower than the oil supply port side flange 35 of the oil supply port side recessed portion 25 on the inner side in the vehicle width direction.

Thus, the embankment shaped portion 29 and the hinge storage portion 28 can be disposed in a way of being inserted into the inner side in the vehicle width direction of the rear fender 12 from the fender opening portion 13 (both see FIG. 2). Accordingly, the oil supply port side flange 35 of the oil supply port side recessed portion 25 can be disposed on the flange 15 of the fender opening portion 13 (both see FIG. 2).

The embankment shaped portion 29 has a first embankment portion 61 and a second embankment portion 62.

The first embankment portion 61 is formed in a way of being continuous to the first side wall end portion 32a and has: a first embankment inner side wall (side wall) 63, a first embankment outer side wall 64, a first embankment top portion (top portion) 65, a first embankment end wall 66, and a partition wall 67.

The first embankment inner side wall 63 is formed in a way of being continuous to the first side wall end portion 32a of the oil supply port side wall 32. The first embankment outer side wall 64 is formed on the outer side of the oil supply port side recessed portion 25 (that is, the hinge storage portion 28 side) with an interval from the first embankment inner side wall 63.

The first embankment top portion 65 is formed at an edge of the first embankment inner side wall 63 on the left outer side in the vehicle width direction and at an edge of the first embankment outer side wall 64 on the left outer side in the vehicle width direction.

The first embankment end wall 66 is formed on an end portion of each of the first embankment inner side wall 63, the first embankment outer side wall 64, and the first embankment top portion 65, which is opposite to the first side wall end portion 32a.

The first embankment portion 61 is formed in an embankment shape having a U-shaped cross section by the first embankment inner side wall 63, the first embankment outer side wall 64, and the first embankment top portion 65.

In addition, the partition wall 67 is formed on the first embankment top portion 65. Specifically, the partition wall 67 protrudes (is erected) along the first embankment inner side wall 63 from a part of the first embankment top portion 65 on the side of the oil supply port side recessed portion 25 toward an opening end of the oil supply port side recessed portion 25 (that is, the left outer side in the vehicle width direction). Accordingly, a partition effect between the oil supply port side recessed portion 25 and the hinge storage portion 28 (described later) can be increased by the partition wall 67.

Meanwhile, the fuel adapter cover 21 is formed by, for example, injection-molding. Therefore, a draft for opening a mold is formed on the oil supply port side wall 32, the first embankment inner side wall 63, and the like.

Here, a wall surface 67a of the partition wall 67 on the side of the oil supply port side wall 32 protrudes along the first embankment inner side wall 63. Therefore, for example, when a wall thickness of the partition wall 67 is constant, it is considered that a wall surface 67b of the partition wall 67 that is opposite to the oil supply port side wall 32 (that is, a wall surface on the side of the hinge storage portion 28) becomes an undercut when the mold is opened.

Thus, the draft for opening the mold is also formed on the wall surface 67b of the partition wall 67 that is opposite to the oil supply port side wall 32. Specifically, for example, when the first embankment top portion 65 is formed in a way of being orthogonal to a mold opening direction of the mold, an inclination angle of the wall surface 67b of the partition wall 67 that is opposite to the oil supply port side wall 32 with respect to the first embankment top portion 65 is formed in an obtuse angle greater than 90° with respect to the mold opening direction of the mold.

Thus, with regard to the partition wall 67, the draft is formed on both the wall surface 67a on the side of the oil supply port side wall 32 and the wall surface 67b on the opposite side of the oil supply port side wall 32 with respect to the mold for injection-molding the fuel adapter cover 21. Accordingly, for example, when the fuel adapter cover 21 is injection-molded, the partition wall 67 can be prevented from becoming an undercut, and simplification of the mold can be achieved.

The second embankment portion 62 is formed in a way of being continuous to the first embankment portion 61 and the second side wall end portion 32b. The second embankment portion 62 has: a second embankment inner side wall (side wall) 71, a second embankment outer side wall 72, and a second embankment top portion (a top portion facing the hinge 22) 73. Similar to the first embankment portion 61, the second embankment portion 62 is formed in an embankment shape having a U-shaped cross section by the second embankment inner side wall 71, the second embankment outer side wall 72, and the second embankment top portion 73.

Here, the first embankment portion 61 is formed in an embankment shape having a U-shaped cross section by the first embankment inner side wall 63, the first embankment outer side wall 64, and first embankment top portion 65. Thus, by the first embankment portion 61 and the second embankment portion 62, the embankment shaped portion 29 having high rigidity is formed.

The embankment shaped portion 29 having high rigidity is formed in a way of being continuous to the first cover portion 26 and the second cover portion 27 in a plan view. Thus, the rigidity of the oil supply port side recessed portion 25 (that is, the fuel adapter cover 21) can be increased by the embankment shaped portion 29. Accordingly, the fuel adapter cover 21 can be inserted from the fender opening portion 13 and easily assembled to the rear fender 12.

In addition, the second embankment inner side wall 71 is formed in a way of being continuous to the first embankment inner side wall 63. Furthermore, the second embankment outer side wall 72 is formed on the outer side of the oil supply port side recessed portion 25 (that is, the hinge storage portion 28 side) with an interval from the second embankment inner side wall 71, and is formed in a way of being continuous to the first embankment outer side wall 64.

In this way, the first embankment inner side wall 63 of the first embankment portion 61 and the second embankment inner side wall 71 of the second embankment portion 62 are continuously formed. In addition, the first embankment inner side wall 63 is formed in a way of being continuous to the oil supply port side wall 32. Furthermore, the second embankment inner side wall 71 is also formed in a way of being continuous to the oil supply port side wall 32. Accordingly, the rigidity of the oil supply port side recessed portion 25 can be increased by the embankment shaped portion 29, and the shape of the oil supply port side recessed portion 25 (the fuel adapter cover 21) can be reliably ensured.

In addition, the second embankment top portion 73 is connected to an edge of the second embankment inner side wall 71 on the outer side in the vehicle width direction and an edge of the second embankment outer side wall 72 on the outer side in the vehicle width direction, and is formed to face the hinge 22. The second embankment top portion 73 is formed in a curved shape in a way of gradually separating from the oil supply port side bottom portion 33 from an end portion 66a of the first embankment end wall 66 on the side of the oil supply port side bottom portion 33 toward the second side wall end portion 32b.

Thus, by the first embankment end wall 66 and the second embankment top portion 73, the recess portion 75 facing the hinge 22 is formed. That is, the embankment shaped portion 29 has the recess portion 75 facing the hinge 22. The recess portion 75 is formed in a recessed shape in a way of surrounding the hinge 22 and in a way of being recessed toward the oil supply port side bottom portion 33.

Accordingly, an escape portion for the hinge 22 can be formed by the recess portion 75, and the hinge 22 can be prevented from interfering with the embankment shaped portion 29.

Figure 6:
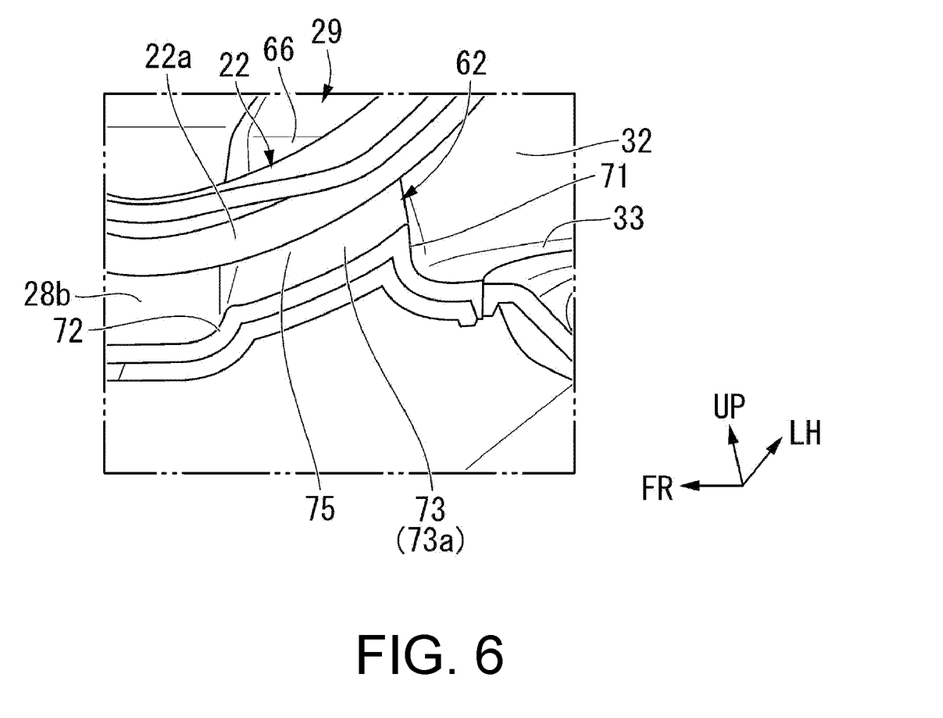
FIG. 6 is a cross-sectional view in which a VI portion of FIG. 3 is enlarged.

As shown in FIG. 3 and FIG. 6, the second embankment top portion 73 is inclined in a way of becoming lower toward the bottom portion 28b of the hinge storage portion 28 (that is, the inner side in the vehicle width direction) as directed from the oil supply port side recessed portion 25 toward the hinge storage portion 28.

Thus, a surface (an upper surface) 73a of the second embankment top portion 73 that faces the hinge 22 can be disposed with an interval from an inclined bottom portion 22a of the hinge 22. Accordingly, the second embankment top portion 73 can be prevented from interfering with the hinge 22 (specifically, the inclined bottom portion 22a).

(Hinge)

The main part of the hinge 22 is stored in the hinge storage portion 28 adjacent to the embankment shaped portion 29. The hinge 22 is a member which supports the fuel lid 23 and attaches the fuel lid 23 to the fender opening portion 13 (see FIG. 2) of the vehicle-body 10 in a way that the fuel lid 23 is opened/closed freely. For example, the hinge 22 is formed in a U-shape in a side view, and a base end portion 22b of the hinge 22 is pivotally supported (pivotally attached) on a bracket 81 in a way of pivoting freely via a support shaft 82.

Figure 7:
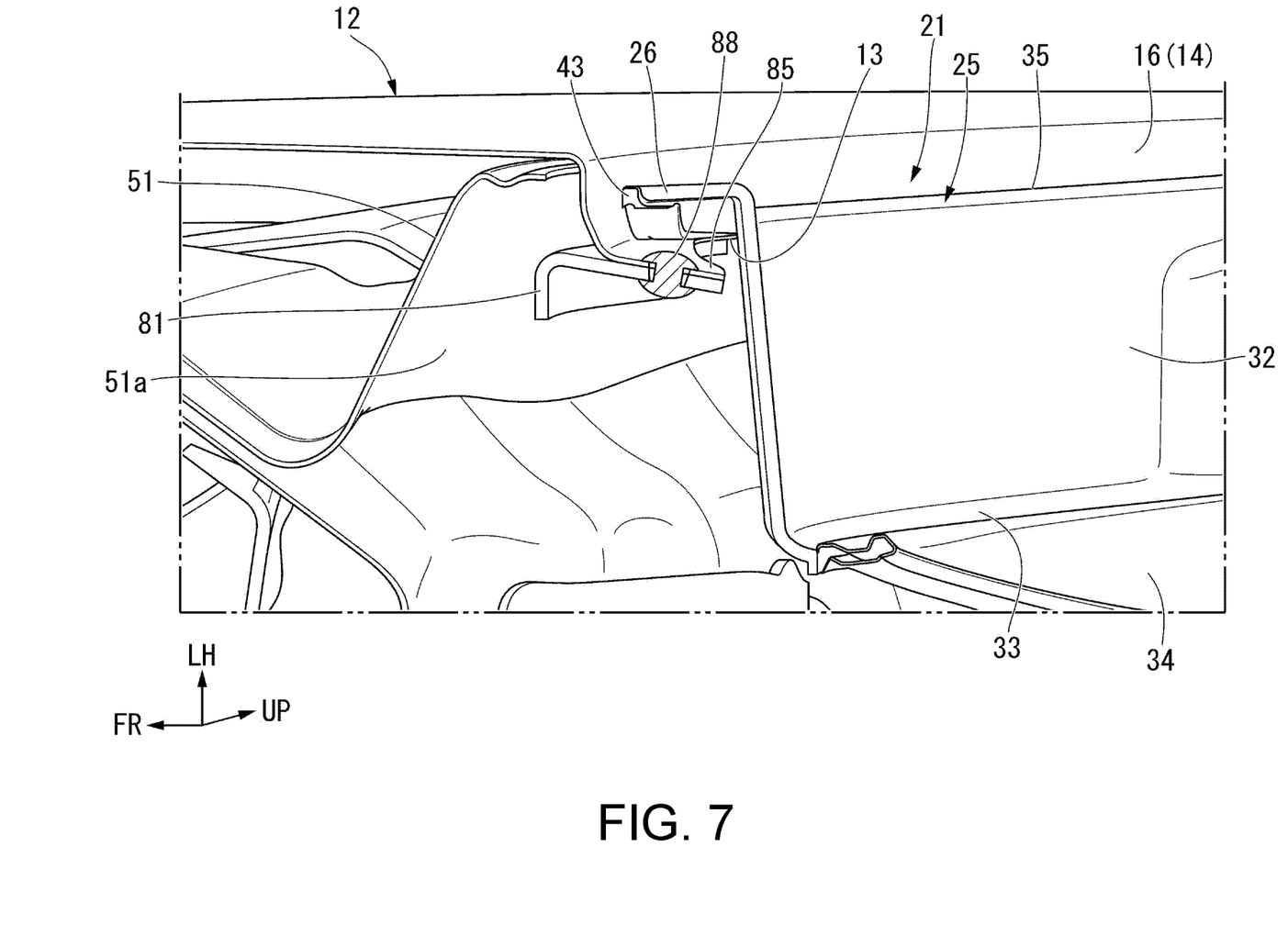
FIG. 7 is a cross-sectional view broken along a VII-VII line of FIG. 1.

As shown in FIG. 2, FIG. 3, and FIG. 7, the bracket 81 supporting the hinge 22 is fixed to, for example, a first attachment portion 85 and a second attachment portion 86 of the rear fender (body) 12. Specifically, the bracket 81 is fixed to the first attachment portion 85 by a fixing portion such as the first rivet 88 or the like, and is fixed to the second attachment portion 86 by a fixing portion such as the second rivet 89 (see FIG. 1) or the like.

The first attachment portion 85 and the second attachment portion 86 are formed on an upper corner and a lower corner portion of the flange 15 of the fender opening portion 13 on the front side of the vehicle-body. In addition, the bracket 81 is fixed to the rear wheel house 51. That is, the hinge 22 is supported to the rear fender 12 in a way of pivoting freely by the bracket 81, the first rivet 88, and the second rivet 89.

As described above, according to the fuel adapter cover structure 20 of the embodiment, the bracket 81 is fixed to the first attachment portion 85, the second attachment portion 86, and the like by the first rivet 88 and the second rivet 89. Thus, the bracket 81 is firmly fixed to the rear fender 12. The hinge 22 is pivotally supported on the bracket 81 in a way of pivoting freely. Accordingly, the hinge 22 can be firmly pivotally supported on the rear fender 12.

In addition, the first rivet 88 is covered by the first cover portion 26 from the left outer side in the vehicle width direction (the outer side). Furthermore, the second rivet 89 (see FIG. 1) is covered by the second cover portion 27 from the left outer side in the vehicle width direction (the outer side).

Accordingly, the first rivet 88 and the second rivet 89 can be hidden by the first cover portion 26 and the second cover portion 27 so that they cannot be visually observed from the left outer side in the vehicle width direction.

In addition, the first cover portion 26 and the second cover portion 27 are disposed one step higher than the oil supply port side flange 35 toward the left outer side in the vehicle width direction. Thus, the first cover portion 26 can be disposed separately from the first rivet 88 so as not to interfere with the first rivet 88. In addition, the second cover portion 27 can be disposed separately from the second rivet 89 so as not to interfere with the second rivet 89.

Accordingly, the fuel adapter cover 21 can be inserted from the fender opening portion 13 and easily assembled to the rear fender 12.

Here, as shown in FIG. 4 and FIG. 5, the first cover portion 26 and the second cover portion 27 are formed continuously and integrally with the oil supply port side flange 35. Accordingly, the first cover portion 26 and the second cover portion 27 are not required to be included as separate members, and the number of components can be reduced.

Note that, in the embodiment, the first rivet 88 and the second rivet 89 are illustrated as the fixing portion for fixing the bracket 81 to the first attachment portion 85 and the second attachment portion 86 of the rear fender 12, but the fixing portion is not limited hereto. Bolt or spot welding and the like may be used as other examples of the fixing portion.

It should be noted that the technical scope of the disclosure is not limited to the above embodiment, and various modifications can be added without departing from the gist of the disclosure.

For example, in the above embodiment, an example is described in which the fuel adapter cover structure 20 is attached to the rear fender 12 arranged on the left side of the vehicle-body 10, but it is not limited hereto. As another example, for example, the fuel adapter cover structure 20 may be attached to another part such as a rear fender on the right side or the like.

In addition, within a range not departing from the gist of the disclosure, the constituent elements in the above embodiment can be appropriately replaced by well-known constituent elements, and the variation examples described above may be appropriately combined.

What is claimed is:

1. A fuel adapter cover structure of a vehicle, comprising:
   an oil supply port side recessed portion, being configured in a recessed shape in a way of surrounding an oil supply port, and having a flange projecting outward from an opening end in a recessed shape;
   a hinge storage portion, being configured to store a hinge supporting a fuel lid that opens/closes the oil supply port side recessed portion;
   a cover portion, being continuous to the flange of the oil supply port side recessed portion; and
   an embankment shaped portion, being positioned on a side that is closer to a bottom portion in a recessed shape of the oil supply port side recessed portion than the cover portion, and configured in a way of being continuous to the cover portion in a plan view;
   wherein by the cover portion, a fixing portion for supporting the hinge to a body is covered from an outside,
   wherein the embankment shaped portion includes a first embankment portion and a second embankment portion,
   the first embankment portion and the second embankment portion are formed in an embankment shape having a U-shaped cross section.

2. The fuel adapter cover structure of a vehicle according to claim 1, wherein
   the cover portion is disposed one step higher than the flange on an outer side of the vehicle.

3. The fuel adapter cover structure of a vehicle according to claim 1, wherein
   the embankment shaped portion is continuous to a side wall configured along the bottom portion of the oil supply port side recessed portion, and
   the embankment shaped portion has a recess portion which surrounds the hinge.

4. The fuel adapter cover structure of a vehicle according to claim 1, wherein
   the hinge is pivotally supported in a way of pivoting freely by a bracket which is fixed to a side outer panel configuring an outer surface of the body.

5. The fuel adapter cover structure of a vehicle according to claim 1, further comprising:
   a seal portion, being arranged at a peripheral edge of the hinge storage portion,
   wherein the seal portion is configured to seal a space between a wheel house of the body and the peripheral edge by coming into contact with the wheel house.

6. The fuel adapter cover structure of a vehicle according to claim 1, wherein the embankment shaped portion comprises:
   a top portion which faces the hinge and is inclined toward a bottom portion of the hinge storage portion as directed from the oil supply port side recessed portion to the hinge storage portion.

7. The fuel adapter cover structure of a vehicle according to claim 6, wherein the embankment shaped portion comprises:
   a partition wall which protrudes from a part of the top portion on the side of the oil supply port side recessed portion.

8. The fuel adapter cover structure of a vehicle according to claim 7, wherein
   the partition wall is configured with a draft with respect to a mold for injection-molding a fuel adapter cover comprising the oil supply port side recessed portion, the hinge storage portion, the cover portion, and the embankment shaped portion.

* * * * *